Oct. 26, 1965  E. W. GUSTAFSON ETAL  3,213,992
SAFETY GUARD FOR POWER PRESSES

Filed Aug. 3, 1962  7 Sheets-Sheet 1

INVENTORS
ERIC GUSTAFSON &
JONAS THEODORE LINDQUIST
BY
THEIR ATTORNEYS.

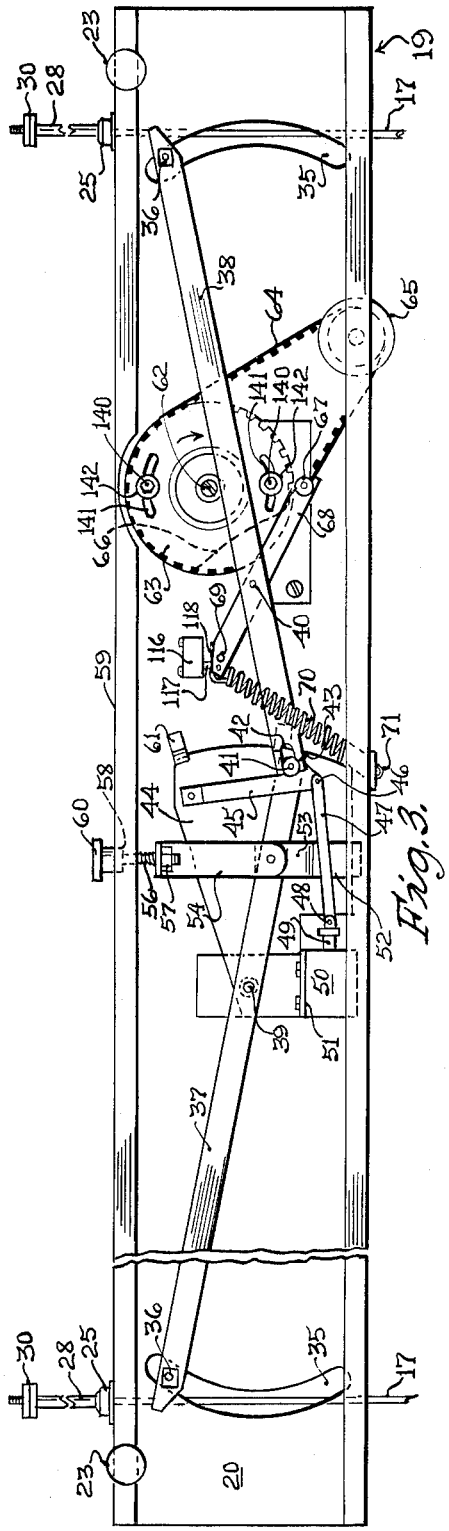

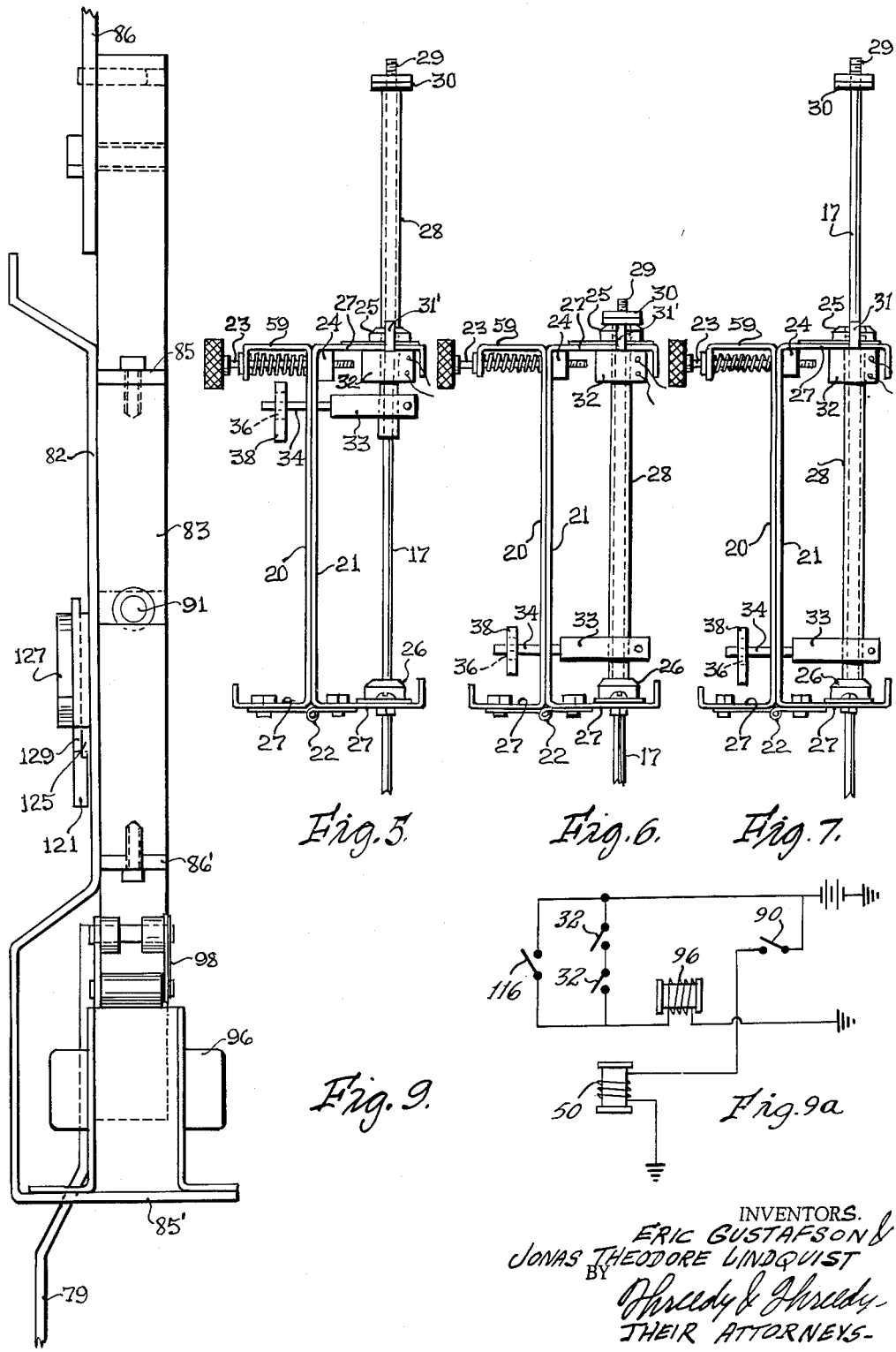

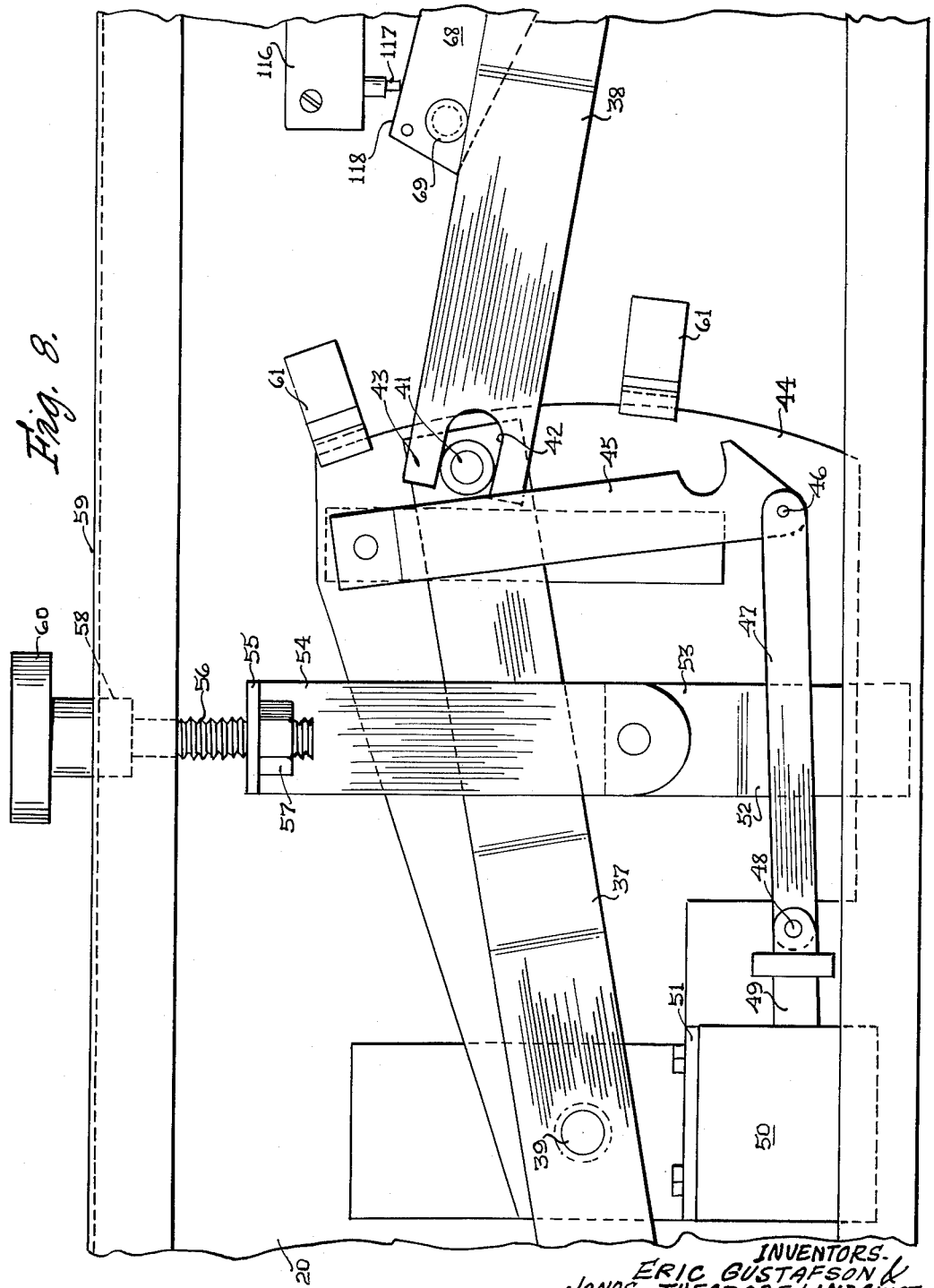

Oct. 26, 1965    E. W. GUSTAFSON ETAL    3,213,992
SAFETY GUARD FOR POWER PRESSES
Filed Aug. 3, 1962    7 Sheets-Sheet 6

INVENTORS.
ERIC GUSTAFSON &
JONAS THEODORE LINDQUIST
BY
Kennedy & Kennedy
THEIR ATTORNEYS.

Oct. 26, 1965 E. W. GUSTAFSON ETAL 3,213,992
SAFETY GUARD FOR POWER PRESSES
Filed Aug. 3, 1962 7 Sheets-Sheet 7

INVENTORS.
ERIC GUSTAFSON &
JONAS THEODORE LINDQUIST
BY
Shready & Shready
THEIR ATTORNEYS.

United States Patent Office 3,213,992
Patented Oct. 26, 1965

3,213,992
SAFETY GUARD FOR POWER PRESSES
Eric W. Gustafson, Chicago, and Jonas Theodore Lindquist, 7654 Tripp Ave., Skokie, Ill.; said Gustafson assignor to said Lindquist
Filed Aug. 3, 1962, Ser. No. 214,741
4 Claims. (Cl. 192—134)

Our invention relates to a new and useful improvement in a safety device and more particularly to a safety guard of a type associated with power presses or the like.

The principal object of our invention is in the provision in a device of this character of a means for preventing operation of a power press when there is present an obstruction other than the work piece in the path of the movable elements normally associated with such power presses or the like.

A further object of our invention is in the provision in a device of this character of an electrical-mechanical control for a mechanical power press which protects the operator from improperly operating the same.

Another object of our invention is in the provision in a safety device in the form of a guard which prevents or interrupts the operation of the machine with which the guard is associated unless the guard is in a protective position.

Yet another object of our invention comprising an improved safety device, is in the means of construction which permits convenient and inexpensive incorporation of the safety device on to existing mechanical power presses or the like.

Still another object of our invention is in the provision in a safety device of this character which is in the form of a reciprocating guard adapted to be first moved into a protective position prior to the commencement of the actuation of the power supply or operating mechanism which controls the movement of the movable elements of the press, and which guard will remain in its protective position during a predetermined period of operation of the press, and at the end of such time, the guard will be reset to its normal or raised position.

An equally important object of our invention is in the provision in a safety device of this character of a combination safety guard and press actuating control which cooperate to permit the normal operation of a press when such press is being actuated in the approved manner.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 3 is a front elevational view of the safety guard's positioning mechanism which is contained within a housing carried by the press and which housing has its front cover plate removed. The parts shown are in their normal rest position.

FIG. 4 is a view similar to FIG. 3 but showing the parts thereof in an actuated position whereby the guard plate has been moved into a protective position.

FIG. 5 is an end elevational view of the guard supporting mechanism as contained within the housing and with the end plate thereof removed showing the position of the parts of the supporting mechanism when the guard plate is in its normal or rest position as seen in FIGS. 1 and 3.

FIG. 6 is a view similar to FIG. 5, but showing the parts thereof when the guard plate is in its protective position.

FIG. 7 is a view similar to FIGS. 5 and 6, but showing the parts thereof when the guard is in an abnormal position indicating an unsafe operating condition for the machine.

FIG. 8 is a fragmentary detailed enlarged view of the safety guard positioning mechanism.

FIG. 9 is an end elevational view of the control panel as associated with our safety device.

FIG. 9A is a schematic drawing of a circuitry embodied in the invention.

Figures 1, 2:
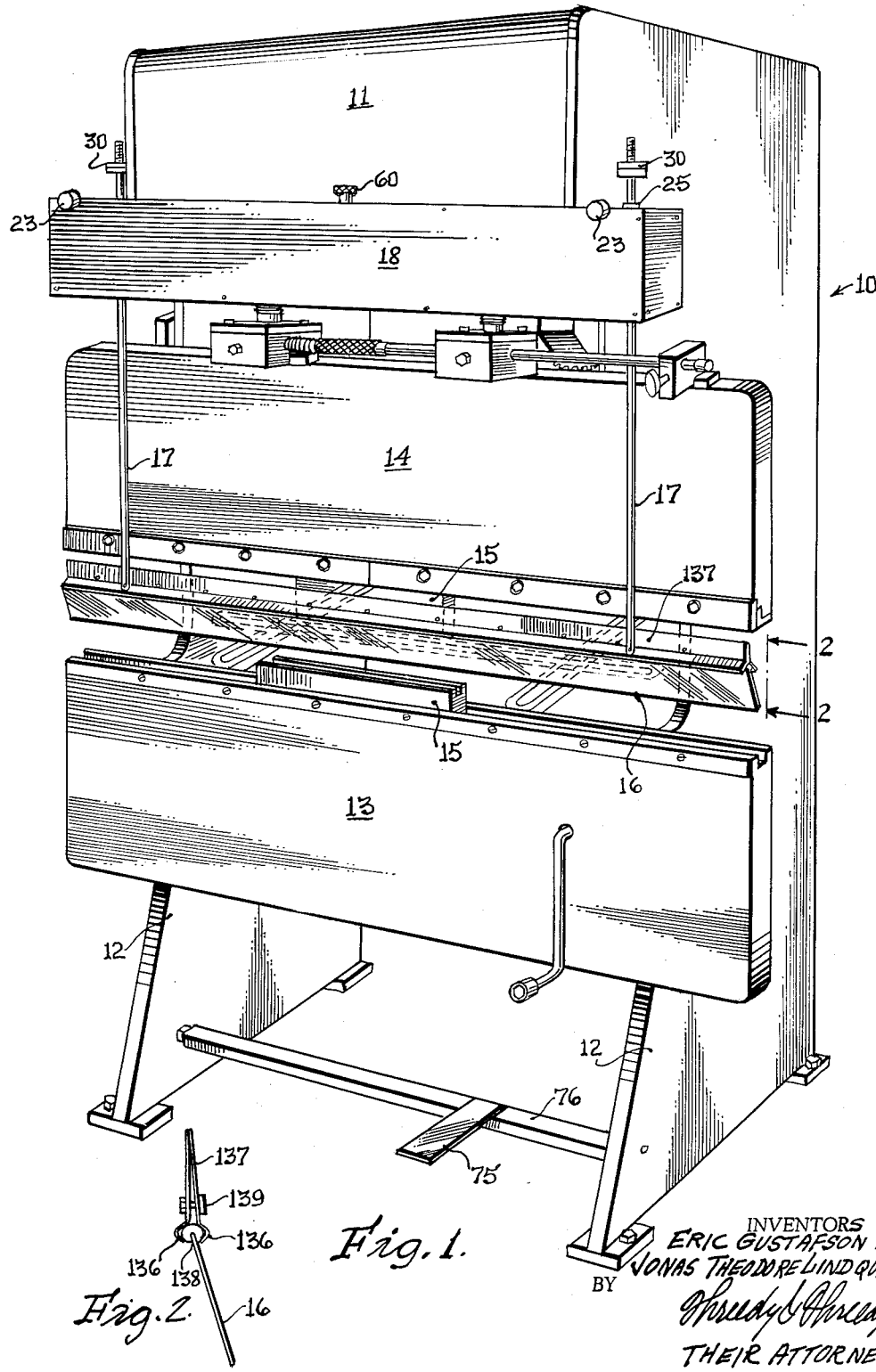
FIG. 1 is a perspective view of a mechanical press brake with our improved safety device thereon.
FIG. 2 is an end elevational view of our improved guard plate taken on line 2—2 of FIG. 1.

This invention relates to a combination safety device and operating mechanism for a power press or the like and provides an arrangement whereby the operator of such press or the like is safeguarded against injury resulting from improperly operating the press.

The one embodiment of our invention as shown in the accompanying drawings and hereinafter described is applied to a power press brake which includes as a standard part thereof a friction type clutch mechanism which normally actuates the press' ram or plunger. The clutch mechanism is normally disengaged but can be caused to engage the drive of the press through the operation of a foot treadle, the depression of which by the foot of the operator, actuates or trips the press. As the friction type clutch, together with the drive mechanism of the press, are all standard equipment and old in the art and make up no part of this present invention they will not be described in detail.

The press brake, as illustrated, is carried by a frame 10 which includes a partial front wall 11, side walls 12, and a die bed 13. A reciprocal die supporting plate 14 is internally mounted to the drive mechanism of the press and moved thereby through a vertical plane when the drive mechanism is caused to be operated. The die bed 13 and die supporting plate 14 are shown as carrying forming dies 15 which are adapted to be brought together upon a piece of work under the operating pressure of the press.

In order to protect the operator from injury due to his own negligence or inadvertence, we provide a safety attachment in the form of the guard 16 which extends across the full face of the die bed 13 and which has a protective position in front of the forming dies during the operation of the press. This safety attachment rerequires the operator to remove his hands or any other obstructions from the path of movement of the die supporting plate 14, or ram or press plunger as the case may be.

The movable guard 16 is carried by supporting rods 17 arranged so as to be slidably projectable through a suitable housing 18 carried by the front wall 11 of the press 10 as shown in FIG. 1. Within the housing 18 is the safety guard positioning mechanism. This mechanism is carried by a framework 19 positioned within the housing 18 and consisting of two oppositely extending substantially U-shaped elongated plates 20 and 21 shown in FIGS. 3 through 7. These plates 20 and 21 are hinged together along their bottom edges by a suitable hinge means 22. The upper edge portions of the plates 20 and 21 are connected together by an adjusting bolt 23 threadable through a block 24 fixedly carried by the plate 21. The plate 20 is permanently attached to the bottom wall of the housing 18 and thus it is readily apparent that by rotation of the adjusting bolt 23 relative to the block 24, the plate 21 may be pivoted about the horizontally extending hinge 22. This pivotal movement of the plate 21 will tend to vary the vertical plane of the supporting rod 17 and consequently change the protective position of the guard 16 laterally with respect to the forming dies 15. By this arrangement, the guard 16 may be caused to be positioned as near as possible to the plane of engagement between the operating position of the forming dies 15.

The rods 17 are each journaled through a set of suitable bushings 25 and 26 carried by the spaced apart arms 27 of the plate 21 adjacent the opposite ends thereof. The bushings 25 are of a size that will suidably accommodate a hollow sleeve 28 which freely encases a portion of each of the rods 17 as seen in FIGS. 5, 6, and 7. The upper ends of the rod 17 are threaded as at 29 and have threaded thereon stop nuts 30. These stop nuts 30 prevent the withdrawal of the rods 17 downwardly out of the housing 18. These stop nuts 30 will also engage a switch finger 31 of a switch 32 carried beneath the uppermost arm 27 adjacent each of the bushings 25, when the guard 16 is permitted to drop into its protective position in a manner hereinafter made apparent. This position of the stop nuts 30 with respect to the switch fingers 31 is clearly illustrated in FIGS. 4 and 6. The switch fingers 31 normally project through suitable openings formed in the arm 27 into an elevated position with respect to the top surface of the bushings 25 as seen in FIGS. 5 and 7. The function of the switches 32 will be hereinafter explained.

The sleeves 28 adjacent their lower ends have fixedly attached thereto a lateral extension 33. Each of these lateral extensions 33 carry a connecting pin 34 which projects through oppositely arcuated slots 35 formed in the plates 20 and 21 adjacent each end thereof as seen in FIGS. 3 and 4. These connecting pins 34 are freely projected through enlarged openings 36 formed in the opposite ends of positioning arms 37 and 38.

These positioning arms 37 and 38 are pivotally supported as at 39 and 40 to the plate 20 as seen in FIGS. 3 and 4. One end of the arm 37 carries a lateral stud 41 which is freely positioned within a notch 42 formed in the confronting end 43 of the positioning arm 38. By this arrangement, the positioning arms 37 and 38 are adapted to be pivoted in unison about their pivotal connections 39 and 40.

Also pivoted on the pivotal connection 39 of the positioning arm 37 is an adjusting plate 44. This adjusting plate 44 pivotally carries a latch element 45. The latch element 45 is provided with a hook type end which is adapted to engage the stud 41, which connects the opposite free ends of the positioning arms 37 and 38 together so as to releasably hold such positioning arms 37 and 38 in a latched or normal position as seen in FIG. 3.

The free end of the latch element 45 is connected as at 46 to one end of an extension 47 that is pivotally connected as at 48 to the exposed end of an armature 49 of a solenoid 50. The solenoid 50 is fixedly mounted on a lateral flange 51 struck from the plate 44 and as such is pivoted therewith.

The adjusting plate 44 is provided with a finger 52 which is provided with an offset portion 53 which is in turn spaced from one side of the plate 44 and into which space may pivotally move a portion of the positioning arm 37 as viewed in FIG. 3, when such arm 37 is caused to be moved into its latched position. Pivotally connected to the free end of the offset portion 53 of the finger 52 is a hanger 54. This hanger 54 is provided with a lateral flange 55 through which projects the threaded end of an adjusting bolt 56. Threaded upon the adjusting bolt 56 beneath the flange 55 is a nut 57. The adjusting bolt 56 extends through a suitable bushing 58 carried by the upper arm 59 of the plate 20. The adjusting bolt 56 terminates into a suitable exposed knob 60 as seen in FIGS. 1, 3, 4, and 8. The plate 20 also provides guide tabs 61 that freely engage the free end of the adjusting plate 44 as seen in FIG. 8.

By the construction and arrangement of parts just described, the adjusting plate 44 may be vertically pivoted about the pivotal connection 39 between the arms 27 of the U-shaped plate 20. As the adjusting bolt 56 is rotated by manipulation of the exposed knob 60, the plate 44 will be caused to pivot. This pivotal movement will position the latch 45 at any desired position between the extreme points of movement of the free ends of the positioning arms 37 and 38 which are shown in FIGS. 3 and 4. By adjusting the location of the latch 45 it is readily apparent that the distance the guard 16 will drop into a protective position when the positioning arms 37 and 38 are released from the latch 45, may be varied.

The positioning arms 37 and 38 are normally latched in the position shown in FIG. 3. In such figure the latch 45 has engaged the stud 41. In this position, the sleeves 28, together with the rods 17, are held in their elevated condition as seen in FIGS. 3 and 5 and the guard 16 is vertically disposed relative to the die bed 13, thus permitting free access to the forming dies 15 carried thereby.

Upon the energization of the solenoid 50, the armature 49 will be moved inwardly of the solenoid 50 and through the extension 47 will pivot the latch 45 out of its latching position permitting the oppositely extending free ends of the positioning arms 37 and 38 to move downwardly into the position shown in FIG. 4. The connecting pins 34 have been caused to move through the arcuated slots 35 as the sleeves 28 and rods 17 move downwardly into the position shown in FIGS. 4 and 6, thus permitting the guard 16 to be lowered into its protective position relative to the die bed 13 and the ram 14.

Carried upon a suitable shaft 62 is a pulley wheel 63. This pulley wheel 63 through a pulley belt 64 is rotatably connected to a driven pulley wheel 65. Connected to the underside of the pulley wheel 63 is a cam 66. Adapted to ride upon the surface of the cam 66 is a cam follower 67 which is rotatably supported on one end of a reset bar 68. This reset bar 68 is pivoted upon the pivotal connection 40 of the positioning arm 38 as viewed in FIGS. 3 and 4. The opposite end of the reset bar 68 provides a roller 69, which roller 69 is adapted to engage the upper edge of the positioning arm 38. The end of the reset bar 68 that carries the roller 69 has one end of a coil spring 70 connected thereto. The opposite end of the coil spring 70 is connected as at 71 to the lowermost arm 27 of the U-shaped plate 20. The spring 70 normally tends to pivot the reset bar 68 counter clockwise about the pivotal connection 40 as viewed in FIGS. 3 and 4. The spring 70 therefore maintains the cam follower 67 in contact with the cam 66.

The pulley wheel 63, together with the cam 66, is adapted to be driven in a clockwise direction about its shaft 62 as viewed in FIGS. 3 and 4. The cam follower 67 will follow the contour of the cam 66 and thus cause pivotal movement of the reset bar 68 about the pivotal connection 40. When the cam follower 67 rides in the dwell of the cam 66 the spring 70 will be of sufficient strength to cause the opposite end of the reset bar 68 to be pivoted in a downward direction and if the roller 69 carried by such end of the reset bar 68 is in engagement with the upper edge of the positioning arm 38, it will cause the positioning arm 38, as well as the corresponding positioning arm 37, to be pivoted about their respective pivotal connections 40 and 39. The pivotal movement of the positioning arms 37 and 38 by the reset bar 68 is completed when the connecting pin 41 is once again yieldably engaged by the hook of the latch 45 at which time the apparatus will be in the condition as shown in FIG. 3.

Figure 10:
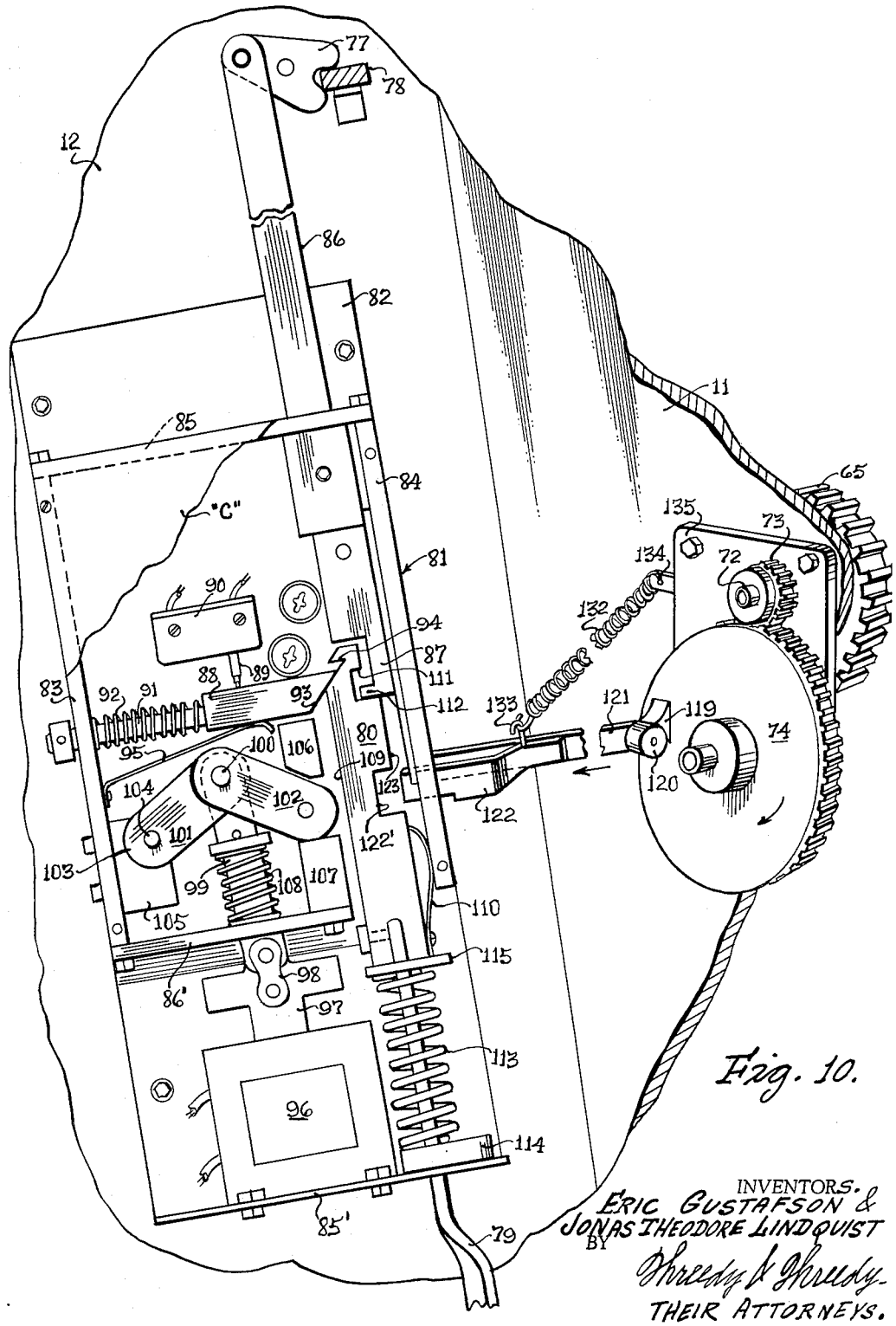
FIG. 10 is a fragmentary side elevational view of the control panel with its cover removed and parts thereof in their normal or rest position, and showing its operative connection to associated parts of the machine and the safety device as associated therewith.

The drive pulley wheel 65 is rotatably carried upon a shaft 72 that extends through the front wall 11 and which rotatably supports a gear wheel 73 positioned behind such wall as seen in FIG. 10. This gear wheel 73 has driving engagement with a cycle control wheel 74, the function of which will be hereinafter more fully explained.

The gear wheel 73 is driven by a chain of gears (not shown) which are normally associated with and provide the driving force for the brake press 10. The chain of gears is electrically operated and the circuit for such driving mechanism includes a plurality of switches which will hereinafter be identified.

In operation of the brake press 10, the operator depresses the foot treadle 75 which is supported upon a rotatable bar 76 which extends between the side walls 12 of the brake press 10, as seen in FIG. 1. In a normal press brake the depression of the foot treadle 75 would pivot a pivot link 77 (FIG. 10) so that a clutch bar 78 would be caused to function to engage the drive mechanism with the press ram or plunger 14 so as to cause the same to move through an operative cycle. This construction and operation is old in the art and makes up no part of this invention.

We have provided an actuating rod connecting mechanism which cooperates with the safety guard for controlling the operation of the mechanism with which it is associated. This actuating rod connecting mechanism comprises the following assembly of parts. The foot treadle 75 will normally cause a depression of a connecting rod 79 which extends in a vertical spaced relation with the inner surface of one side wall 12 of the press. This connecting rod 79 terminates into an engaging head 80. This engaging head 80 is positioned within a housing 81 carried by the inner surface of the side wall 12 of the press brake 10.

The housing 81 includes a back wall 82, side walls 83 and 84, top and bottom walls 85 and 85' respectively, and a centrally located shelf 86'. The housing 81 is normally closed by a cover "C" (partly shown in FIG. 10) which protects the mechanism contained therein.

Operatively associated with the pivot link 77 is an actuating rod 86. This actuating rod 86 extends inwardly of the housing 81 and is provided with an interlocking means 87 which is adapted to be engaged by the engaging head 80 of the connecting rod 79. Carried by the side wall 83 and extending inwardly of the housing 81 is a switch actuating member 88. This switch actuating member 88 normally engages a switch finger 89 of an electrical switch 90 carried within the housing 81 in close proximity to the switch actuating member 88, as seen in FIG. 10.

The switch actuating member 88 is carried at one end of a yieldable support 91. This support 91 has coiled thereabout a spring 92 which yieldably positions the switch actuating member 88 relative to the switch finger 89 of the switch 90 and the side wall 83. The free end of the switch actuating member 88 is provided with a taper 93, which taper 93 corresponds with and is adapted to be engaged by one side of a notch 94 formed in one end of the engaging head 80. The switch actuating member 88 is yieldably held against the switch finger 89 of the switch 90 by a flat spring 95 connected to the side wall 83 of the housing 81.

Figure 11:
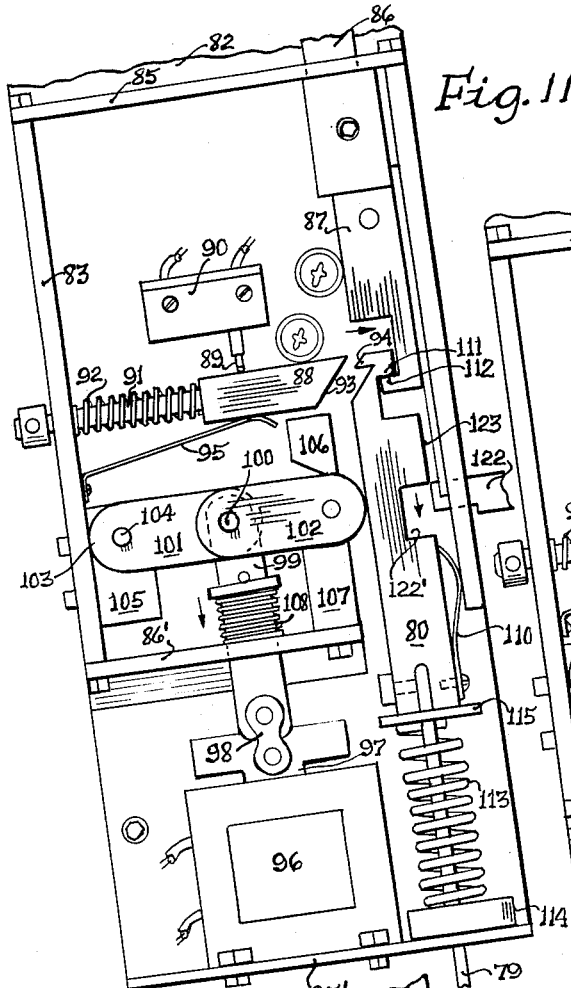
FIG. 11 is a view similar to FIG. 10 but showing certain parts thereof in their initial operated position.
Figure 12:
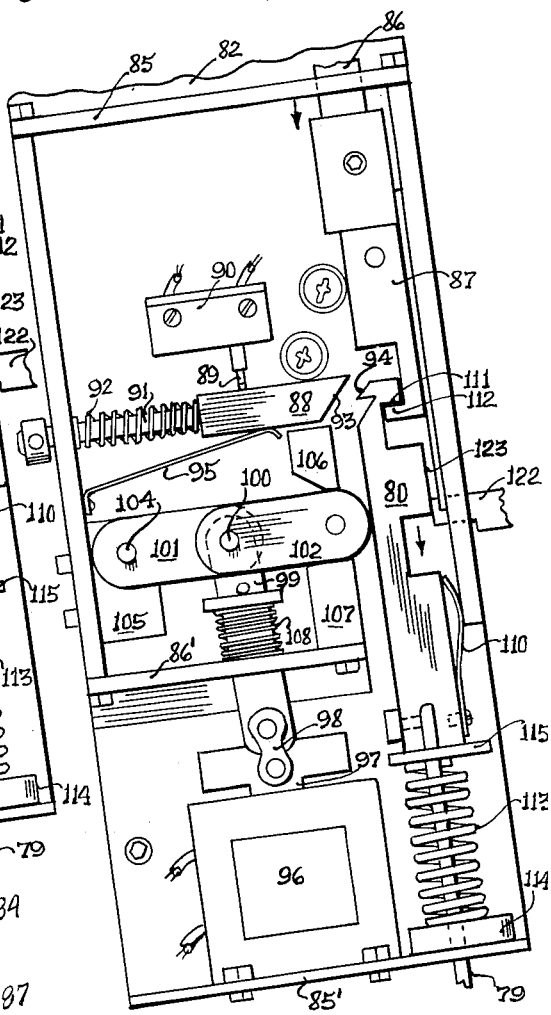
FIG. 12 is similar to FIG. 11, but showing the parts thereof in yet another operated position.

A solenoid 96 is carried by the bottom wall 85 of the housing 81 and includes an armature 97 that is pivotally connected by a link 98 to an extension bar 99 that is in turn pivotally connected to a pin 100 connecting together corresponding ends of toggle members 101 and 102. The toggle member 101 has its opposite end 103 pivotally connected as at 104 to a fixed mounting block 105 carried by the side wall 83 of the housing 81. The corresponding opposite free end of the toggle member 102 is adapted to be positioned between spacer blocks 106 and 107. The arrangement is such that when the solenoid 96 is energized and the armature thereof is drawn within the solenoid 96, the bar 99 is pulled downwardly against the tension of a coil spring 108 causing the toggle members 101 and 102 to be pivoted into the position as shown in FIGS. 11 and 12. As the toggle member 102 is caused to be moved, its free end will pass between the spacer blocks 106 and 107 into engagement with one edge 109 of the engaging head 80 carried by the connecting rod 79. This action of the toggle will move the engaging head in the direction of the side wall 84 against the normal action of a flat spring 110 carried by the engaging head as seen in FIGS. 11 and 12.

The engaging head 80 is provided with a shoulder 111 which is adapted to engage a finger 112 provided by the free end of the interlocking means 87. The connecting rod 79 and the engaging head 80 are normally retained in the position shown in FIG. 10 by a coil spring 113 which is disposed between a bushing 114 carried by the bottom wall 85, and through which the connecting rod 79 extends, and a circular washer 115 carried by one end of the engaging head 80 adjacent the point where the connecting rod 79 is connected thereto.

The operation of our improved safety device is as follows:

The normal, or rest position, of the safety guard 16 is that shown in FIG. 1. The normal position of the safety guard supports is shown in FIG. 5. The normal arrangement of parts of the positioning mechanism for the safety guard is shown in FIG. 3. The normal or rest position of the actuating rod connecting mechanism is shown in FIG. 10.

When the press is adapted to be actuated, the operator will depress the treadle 75. This movement of the treadle 75 will cause a corresponding downward movement of the connecting rod 79 and the engaging head 80 against the action of the spring 113. The switch actuating member 88 will be engaged by the notch 94 of the engaging head 80 and be momentarily pulled downwardly against the action of the flat spring 95. As the switch actuating member 88 is so moved, the switch 90 will be closed energizing an electric circuit to the solenoid 50 (FIGS. 3 and 4) causing the latch 45 to be moved so as to release the positioning arms 37 and 38 whereby the safety guard 16 will be permitted to fall into its protective position.

Upon release of the positioning arms 37 and 38, the rods 17 which support the safety guard 16 will drop downwardly so that the lock nuts 30 thereon engage the switch fingers 31 (FIGS. 5 and 6) closing the switches 32. The closing of the switches 32 will energize the solenoid 96. As the solenoid 96 is energized, the toggle joint is moved into the position shown in FIG. 11. In such a position, the toggle link 102 has been moved into engagement with the edge 109 of the engaging head 80 and caused the same to be moved through a horizontal plane to a position adjacent the side wall 84, FIG. 11. This movement of the engaging head 80 releases the switch actuating member 88 and the same is returned to its normal position opening the switch 90 and deenergizing the solenoid 50.

In the now new position of the engaging head 80, the shoulder 111 thereof is brought into horizontal overlapping alignment with the finger 112 of the interlocking means 87. Upon further downward movement of the connecting rod 79 and the integrally connected engaging head 80, the actuating rod 86 is caused to move downwardly as seen in FIG. 12. This downward movement of the actuating rod 86 will pivot the link 77 against the clutch bar 78 causing the same to actuate the power drive for the ram 14 of the press.

In the event that the operator has not removed his hands or any other foreign obstruction from between the die bed 13 and the die supporting plate 14 (or ram or press plunger as it may be) the guard 16 will engage such obstruction and the rod 17 will not be permitted to move downwardly so as to engage the switch finger 31 and close the corresponding switch 32. The failure of the switch 32 to close will prevent the solenoid 96 from being energized. The failure of the solenoid 96 to be energized prevents the toggle joint from being actuated so as to laterally move the engaging head 80 into a position where the shoulder 111 will engage the finger 112 of the interlocking means 87 carried by the actuating rod 86, and this will prevent the operation of the clutch bar 78 so that the drive mechanism of the press is disconnected from the die supporting plate 14 and the same will not move through its vertical plane.

It should be noted that at any time during the operation of the press, the guard 16 may be raised and it will instantly de-energize the solenoid 96 effecting disconnection of the actuating rod 86 from the connecting rod 79, causing the press to stop operation.

As the press operation continues the cam follower 67 of the reset bar 68 will follow the cam surface 66 and cause the reset bar 68 to be pivoted under the action of the spring 70 in a counter-clockwise direction about it pivot point 40 as viewed in FIGS. 3 and 4 causing the pivotal resetting movement of the positioning arms 37 and 38.

The pivotal movement of the reset bar 68, resulting from the rotation of the cam 66 and spring 70, will cause actuation of a switch 116 which is carried by the plate 20, FIGS. 3, 4 and 8. The switch 116 is provided with a switch finger 117 which normally is in contact with a flat surface 118 of the reset bar 68, when such bar is not functioning to reset the safety guard 16. The switch 116 is a normally open switch and thus when the switch is actuated by the reset bar, as shown in FIGS. 3, 4, and 8, such switch is in an open condition. When the reset bar 68 is pivoted out of contact with the switch finger 117, the switch 116 will return to its normal condition and be closed.

This switch 116 is in parallel circuit with the switches 32. The switch 116 operates to maintain the solenoid 96 energized during the resetting operation of the guard 16. The operation and function of switch 116 is accomplished in the following manner. When the reset bar 68 is pivoted in the manner hereinbefore described so as to reposition the positioning arms 37 and 38 to cause the return of the guard 16 to its normal or latched position, as seen in FIG. 3, the switches 32 will be open and disengage from the circuitry to the solenoid 96. However, such solenoid 96 is maintained energized by the now closed switches 116 and will remain energized until the cycle of restoring the guard is completed through the operation of the reset bar 68. When the reset bar 68 returns to its normal position as shown in FIG. 3, the switch 116 will be opened disrupting the circuitry to the solenoid 96.

The cycle control wheel 74, as seen in FIG. 10, has been caused to rotate in the direction of the arrow during the cycle of operation of the brake press. On the exposed face of the cycle control wheel 74 there is provided a cam member 119. This cam member 119 engages a cam roller 120 which is carried by a safety reset arm 121. As the roller 120 is engaged by the cam 119, the same is caused to move horizontally in the direction of the arrow as seen in FIG. 10. The safety reset arm 121 is provided with an offset portion 122 which is adapted to extend through a suitable opening in the side wall 84 of the housing 81. Upon the horizontal movement of the arm 121, the offset portion 122 will engage a lateral projection 123 formed on the engaging head 80 and cause the same to be moved to the left, as viewed in FIGS. 12 and 13, so as to disengage the shoulder 111 thereof from the finger 112 provided by the interlocking means 87.

Figure 15:
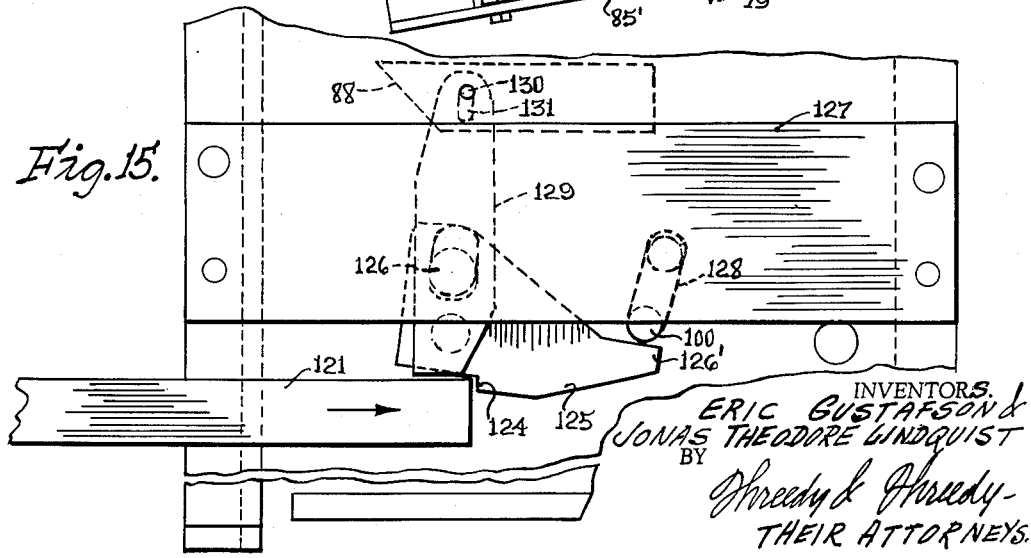
FIG. 15 is a fragmentary elevational view showing a positioning mechanism as mounted on the rear of the control panel and operated by certain associated parts thereof.

Simultaneously, with the movement of the offset portion 122 above described, the reset arm 121 will pass to the rear of the rear wall 82 of the housing 81 and engage a shoulder 124 of a reset latch 125. The reset latch 125 is pivotally carried about a fixed stud 126 which extends through a mounting bracket plate 127 carried in spaced relation to the rear surface of the rear wall 82, as seen in FIGS. 9 and 15. The reset latch 125 is provided with a tail portion 126' which is adapted to have bearing engagement with the connecting pin 100 that pivotally connects the toggle members 101 and 102 together. This pin 100 is adapted to extend through a solt 128 formed in the rear wall 82 of the housing.

Thus it is seen that by the movement of the reset arm 121, as it engages the reset latch 125 near the end of the cycle of operation of the press, the toggle joint is mechanically returned to its original position as shown in FIG. 10. This prevents a malfunction of the safety device in the event that the solenoid 95 is inadvertently maintained in an energized state.

Figure 14:
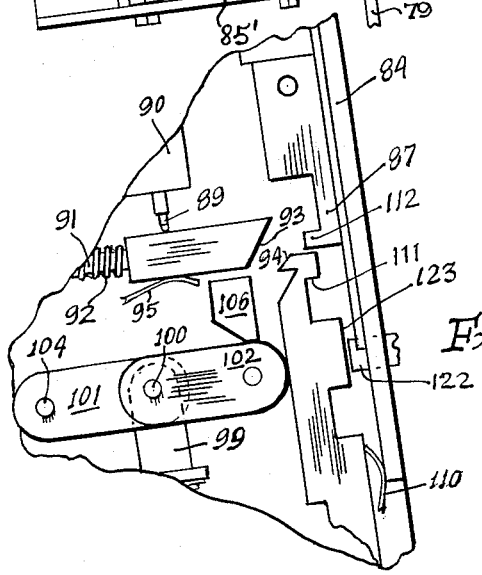
FIG. 14 is a fragmentary side elevational view showing portions of the interlocking operational control mechanism in a non-operative position.
Figure 13:
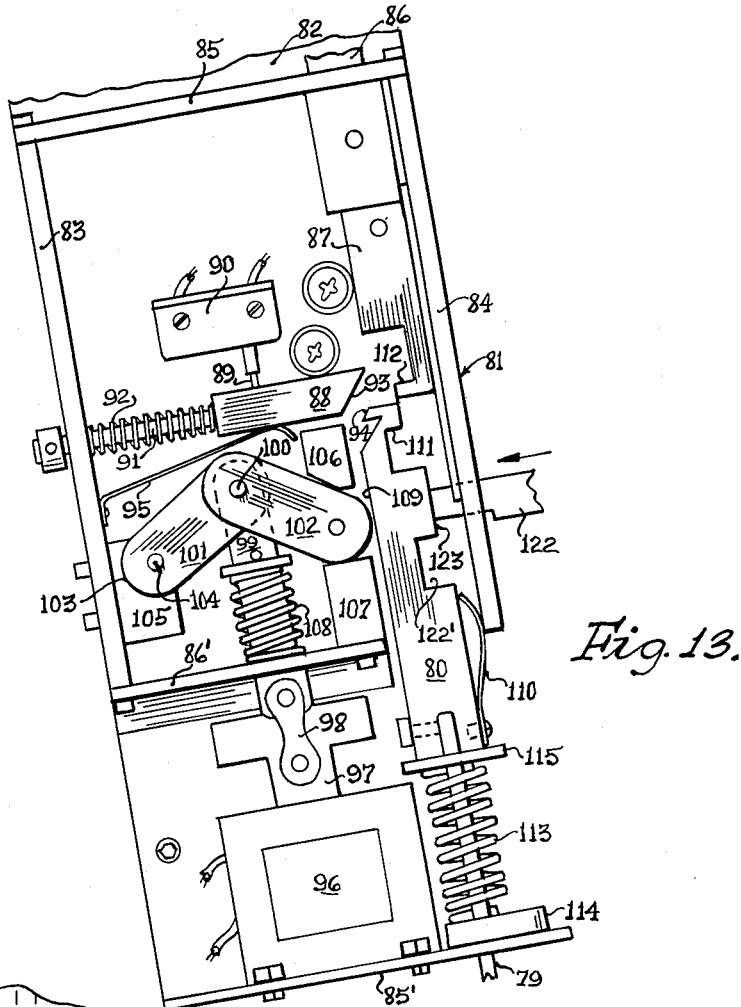
FIG. 13 is a view similar to FIG. 12 but showing the parts thereof near the end of the operating cycle of the machine and of the safety device.

In the event that the solenoid 96 is maintained in an energized state through a malfunction of the press, the following conditions will prevail. In FIG. 13 we show the mechanical resetting of the toggle joint to its original position through the reset arm 121–122. This movement has released the actuating rod 86 from its connection to the connecting rod 79. As the reset arm 121 is caused to return to its normal position and the solenoid 96 is permitted to assume its energized position, the link 102 will bear upon the engaging head and cause the free end thereof to be moved laterally beneath the finger 112 of the interlocking means 87 as shown in FIG. 14, thus creating an inoperative separated condition of the engaging head 80 and interlocking means 87 as carried by the connecting rod 79 and the actuating rod 86 respectively, of the press until the solenoid 96 is de-energized.

In the event that the roller 120 should inadvertently stop upon the cam 119 of the cycle control wheel 74, the safety arm 121 will be mechanically disengaged from the shoulder 124 of the reset latch 125 by a kick-out pin 129 carried by a stud 130 which extends through a slot 131 formed in the back wall 82 of the housing 81, and which is fixedly journalled onto the switch actuating member 88.

Under the initial movement of the switch actuating member 88 by the engaging head 80, as hereinbefore described, the kick-out pin 129 will move through a vertical plane and in the event that the reset arm 121 has remained in pivotal engagement with the reset latch 125, the kick-out pin 129 will engage the top surface of such reset arm 121 and force it downward out of engagement with the latch 125 permitting the same to be pivotally moved by the connecting pin 100 of the toggle joint when the same is pivoted under the action of the energized solenoid 96.

If the roller 120 should stop upon the cam 119, the safety reset arm portion 122 will be projected into a cutout 122' formed in one edge of the engaging head 80, and thus will be prevented from laterally displacing such engaging head 80 out of its normal starting position. By such a construction a mal-functioning of the safety guard and press actuating mechanism is prevented.

The safety reset arm 121 is normally held in its retracted position by a spring 132 which has one end connected to a hook 133 carried by the arm 121 and its opposite end connected to a stud 134 carried by a mounting plate 135 fastened to the rear surface of the front wall 11 of the press.

Referring to FIG. 2, we show the safety guard 16 as comprising a transparent plate which is carried between confronting lips 136 of a channel shaped bracket 137. The lips 146 are compressed upon a circular base 138 which supports the transparent safety guard plate 16 by means of nuts and bolts 139. By this arrangement, the safety guard 16 may be positioned in varying directions so that it will not interfere with the forming dies 15 or the work piece positioned therebetween.

In certain instances and by the nature of the work of the press, it is required that the guard 16 be raised prior to the complete engagement of the forming dies 15. To accomplish this, we have provided an arrangement whereby the cam 66 may be adjustably positioned about the shaft 62 and relative to the resetting bar 68. As seen in FIGS. 3 and 4, the cam 66 is connected to the pulley wheel 63 by screws 140 which extend through arcuated slots 141 formed in the face of the pulley wheel 63. The heads of the screws 140 bear upon enlarged washers 142. By this arrangement the dwell of the cam 66 may be advanced or retracted relative to the cam follower 67 of the reset bar 68 and the normal starting position of the pulley wheel 63, as shown in FIG. 3, so as to effect resetting of the guard 16 during a definite period of time of operation of the press.

At the completion of the normal cycle of operation of the press and the resetting of the guard 16 into its raised or latched position, the press will not continue to operate notwithstanding that the operator maintains the foot treadle 75 in a depressed condition. As the solenoid 96 became de-energized in the manner hereinbefore described, the flat spring 110 together with the mechanical resetting action of the reset arm 121–122 will disengage the head 80 from the interlocking means 87. The operating rod 86 will then return to its normal or raised position as seen in FIG. 10, while the connecting rod 79 will be held in its depressed position against the action of the coil spring 113. And although the spring 110 has positioned the head 80 in a plane through which it may move so as to return to its original position, as seen in FIG. 10, where it could again be caused to engage the interlocking means 87, it cannot so move until the foot treadle 75 is released.

However, we wish to note that the safety guard and the operating control mechanism as described could be easily and simply modified so as to be incorporated in a continuously operating press or the like without departing from the spirit of our invention.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A safety device for a power press having an operating area, comprising
   (a) a clutch operating rod,
   (b) a manual foot-treadle-operated connecting rod in substantial alignment therewith,
   (c) means provided by opposite adjacent ends of said rods for releasably interconnecting said rods together, said connecting rod normally disposed from interconnection with said operating rod and having manual limited independent longitudinal movement with respect to the operating rod,
   (d) means including a pair of links pivoted together to provide a toggle, said links adapted to be pivoted into extended substantially aligned position with respect to each other into engagement with said connecting rod to move the same into said interconnection with the operating rod,
   (e) solenoid means for extending said links,
   (f) guard means,
   (g) means for supporting said guard means on said press for movement from and into said operating area, said guard means being movable into said operating area by gravity,
   (h) latch means for releasably latching said guard means against said movement by gravity,
   (i) an electric circuit for said solenoid means,
   (j) switch means in said circuit for controlling energization of said solenoid means and actuated by and engageable with said guard means when in said operating area,
   (k) a second switch means having an actuating plunger,
   (l) means actuated by the movement of the connecting rod for actuating said plunger to close said second switch means before interconnection of the connecting rod with said operating rod,
   (m) a second solenoid in said circuit and in circuit with said second switch means for actuating, when said second switch means is closed, said latch means to release said guard means for movement by gravity into said operating area.

2. The device defined by claim 1 further characterized by the inclusion of gear driving means for moving said guard means from position in said operating area.

3. A safety device for a power press having an operating area, comprising
   (a) a clutch operating rod,
   (b) a manual foot-treadle-operated connecting rod in substantial alignment therewith,
   (c) means provided by opposite adjacent ends of said rods for releasably interconnecting said rods together, said connecting rod normally disposed from interconnection with said operating rod and having manual limited independent longitudinal movement with respect to the operating rod,
   (d) means for moving said connecting rod into said interconnection with the operating rod,
   (e) solenoid means for actuating said last-mentioned means,
   (f) guard means,
   (g) means for supporting said guard means on said press for movement from and into said operating area, said guard means being movable into said operating area by gravity,
   (h) latch means for releasably latching said guard means against said movement by gravity,
   (i) an electric circuit for said solenoid means,
   (j) switch means in said circuit for controlling energization of said solenoid means and actuated by and engageable with said guard means when in said operating area,
   (k) a second switch means having an actuating plunger,
   (l) means actuated by the movement of the connecting rod for actuating said plunger to close said second switch means before interconnection of the connecting rod with said operating rod,
   (m) a second solenoid in said circuit and in circuit with said second switch for actuating, when said second switch is closed, said latch means to release said guard means for movement by gravity into said operating area.

4. The device defined by claim 3 further characterized by the inclusion of gear driving means for moving said guard means from position in said operating area.

References Cited by the Examiner

UNITED STATES PATENTS

| | | | |
|---|---|---|---|
| 1,542,708 | 6/25 | Larson | 192—134 |
| 2,039,964 | 5/36 | Junkin | 192—134 |
| 2,236,730 | 4/41 | MacBlane | 192—34 |
| 2,683,515 | 7/54 | Horn et al. | 192—134 |
| 2,888,123 | 5/59 | Madden | 192—134 |

DAVID J. WILLIAMOWSKY, *Primary Examiner.*